United States Patent [19]
Mar

[11] 3,859,642
[45] Jan. 7, 1975

[54] RANDOM ACCESS MEMORY ARRAY OF HYSTERESIS LOOP CAPACITORS

[75] Inventor: Jerry Mar, Santa Clara, Calif.

[73] Assignee: Bell Telephone Laboratories, Incorporated, Murray Hill, N.J.

[22] Filed: Apr. 5, 1973

[21] Appl. No.: 348,299

[52] U.S. Cl. ........................ 340/173 CA, 340/173.2
[51] Int. Cl. ........................ G11c 11/22, G11c 11/24
[58] Field of Search ....... 340/173 R, 173 CA, 173.2

[56] References Cited

UNITED STATES PATENTS

| | | | |
|---|---|---|---|
| 2,845,611 | 7/1958 | Williams | 340/173.2 |
| 3,500,142 | 3/1970 | Kahng | 340/173 R |
| 3,549,911 | 12/1970 | Scott | 340/173 R |
| 3,760,378 | 9/1973 | Burns | 340/173 R |

*Primary Examiner*—Terrell W. Fears
*Attorney, Agent, or Firm*—D. I. Caplan

[57] ABSTRACT

A rectangular array of metal-insulator-semiconductor (MIS) capacitors is utilized in a random access memory array apparatus. Each MIS capacitor has a double-insulator layer, with a consequent hysteresis loop characteristic of differential capacitances versus voltage. Write-in of information is accomplished by the application of suitable crosspoint voltages to the array; whereas readout of information (stored in a particular crosspoint capacitor) is accomplished by means of voltage biasing all the capacitors in the array to a sufficiently large negative voltage (lower branch of all hysteresis loops) and then applying a "zero" voltage bias pulse (i.e., within hysteresis loops) to the particular crosspoint capacitor, and also applying a positive voltage pulse to the same crosspoint capacitor during said zero bias pulse. The electrical current response of the crosspoint capacitor to the positive voltage pulse is a measure of the capacitance of the crosspoint capacitor and hence of its memory state.

8 Claims, 4 Drawing Figures

RANDOM ACCESS MEMORY ARRAY OF HYSTERESIS LOOP CAPACITORS

FIELD OF THE INVENTION

This invention relates the field of electrical memory apparatus, and more particularly to semiconductor memory arrays and access circuitry.

BACKGROUND OF THE INVENTION

In the prior art, random access reprogrammable memory arrays utilizing semiconductor memory elements have been conventionally limited to those arrays which use insulated gate field effect transistors (IGFET's) for the memory elements. In such memory arrays, the electrical conductivity of the source-to-drain channel of each IGFET memory element is an indication of the memory state of the element.

Typically, the source-drain conductivity of each IGFET is binary, that is, either a high conductivity channel inversion layer (extending from source to drain) is present or absent. The presence or absence of the inversion layer in each IGFET element in turn depends upon the previous history of applied voltages to the gate of the IGFET. However, memory arrays made up of these IGFET memory elements are somewhat complicated to fabricate and also suffer from relatively poor (slow) acess times required for readout, typically at least $100\times10^{-9}$ seconds. It would therefore be desirable to have memory arrays with faster readout times, and which are somewhat simpler to fabricate.

SUMMARY OF THE INVENTION

A rectangular array of substantially identical capacitors, each having a hysteresis loop capacitance versus voltage characteristic, is accessed by a rectangular conductor array of electrically conductive row and column lines to which voltages may be applied. Each capacitor element has only two terminals, and is thus of a simpler structure than conventional IGFET's. One terminal of every capacitor is connected to a row line, the other terminal to a column line; thereby forming an array of memory capacitors with each capacitor connected at a different row-column crosspoint. In addition, each capacitor element is characterized by the capability of being in one of two possible memory states, that is, by having a double-value of capacitance when voltage biased within the hysteresis loop region and a single-value when otherwise biased. The value of the capacitance at any time, of course, depends upon the previous history of voltages applied thereto ("write-in" or "erase"). The capacitor array in this invention is thus completely "written-in" with an array of memory states when each and every capacitor element is in one or the other desired memory states of capacitance, typically achieved by means of suitable applied write-in voltages.

A selected memory capacitor is addressed for readout in this invention by means of the application of a voltage pulse sequence to the crosspoint. This voltage pulse sequence comprises a first voltage pulse and a second voltage pulse superimposed thereon, both pulses being thereby applied at the crosspoint at which said selected capacitor is located. The first voltage pulse is sufficient to bias the selected capacitor (at the crosspoint) to a voltage within its hysteresis loop. During the application of the first voltage pulse, the second (shorter) voltage pulse is then applied to the selected crosspoint capacitor. This second pulse advantageously has a pulse height which is not sufficient to shift the bias on any capacitor from its single-valued to its double-valued portion of its hysteresis loop. The electrical current response of the selected capacitor during the application of the second voltage pulse (superimposed upon the first pulse) is an indication of the memory state of the selected capacitor. In this way, a random access memory array is afforded in which the signal-to-noise ratio is improved by reason of the detection only of the electrical response to the second pulse, at a time during which the selected capacitor is biased within the hysteresis loop (by the first pulse).

Advantageously, the individual capacitors of the memory array are further characterized in that all the voltages applied during the readout are below threshold for changing the memory states of any capacitor. Hence these applied voltages do not destroy or change the memory states of any of the capacitors in the array. It should be understood, however, that the memory states of these capacitors can indeed be modified prior to readout by the application of sufficient crosspoint voltages above the theshold. Thus, each capacitor is electrically programmable and reprogrammable (write-in or erase) by means of the application of sufficient voltage $\pm V$ to the corresponding row of the selected capacitor simultaneously with the application of opposite polarity voltage $\pm V$, respectively, to the corresponding column of the selected capacitor. The choice of the voltage polarity depends upon the desired write-in versus erase; whereas the value of 2V is selected to be above threshold for write-in or erase, but with V being below threshold.

In a specific embodiment of the invention, a rectangular array of two-terminal metal-insulator-semiconductor (MIS) capacitors is electrically accessed by means of row and column electrical conductor lines. At each row-column crosspoint the terminals of one of the capacitors is connected across the intersecting row and column conductors thereat. Advantageously, each MIS capactior has a double insulator layer of two insulating materials sandwiched between the semiconductor and the metal layer, forming an interface between the insulators ("floating gate") at which electrical charge carriers can be stored. These charge carriers can, for example, be induced to tunnel from the semiconductor to the interface under the influence of an electric field produced by a suitable applied crosspoint voltage above threshold. The stored charge at the interface gives rise to a different electrical capacitance, and hence memory state, than in the absence of stored charge. The resulting different state of stored charge (or absence thereof) thus produces a different capacitance, which can be read out by means of the sequence of first and second voltage pulses described above. For example, in order to read out the stored charge (memory) state of the capacitor located at the intersection of a given column with a given row (X-Y crosspoint), the first and second voltage pulses are applied only to the corresponding row conductor (to bias only all capacitors on the given row within their hysteresis loops), while the electrical current response is detected and measured on the given column conductor only during the application of the second voltage pulse. The magnitude of this current response is an indication of the memory state of the given X-Y crosspoint memory capacitor, whereas the electrical current responses on the other columns indicate the memory states of the other capacitors located on the same row (if desired for reading out a whole line at one time). The duration of the first (longer) pulse can be as short as $30\times10^{-9}$ seconds using ordinary transistor column-row selection and detection circuitry, which can be integrated on a single semiconductor wafer with the array of MIS capacitors likewise integrated on the same wafer. Thus, a relatively simple array of two terminal memory elements with relatively fast readout access time is afforded in this invention.

BRIEF DESCRIPTION OF THE DRAWINGS

This invention, together with its features, advantages, and objects, can be better understood from the following detailed description when read in conjunction with the drawings in which.

Only for the puspose of clarity, none of the Figures is drawn to scale.

Figure 1:
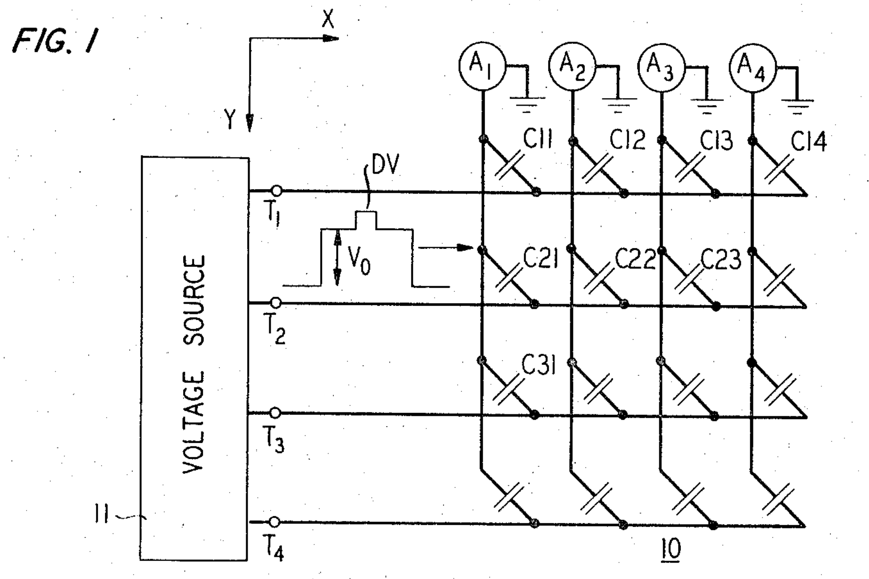
FIG. 1 is a circuit diagram of memory array apparatus in accordance with the invention.

As shown in FIG. 1, a rectangular array 10 of substantially identical memory capacitors $C_{11}$, $C_{12}$, etc., is accessed electrically by X column conductor lines and by Y row conductor lines. For clarity, only a four by four array of such memory capacitors is indicated in FIG. 1, but it should be obvious that arrays with many times more capacitors can be used. Each X column line is terminated by a different current detector $A_1$, $A_2$, $A_3$, $A_4$; and each Y row line is terminated by a different terminal $T_1$, $T_2$, $T_3$, $T_4$ of a control voltage source 11. Each of the capacitors advantageously has a hysteresis loop 10 characteristic of differential capacitance versus voltage, of the type indicated in FIG. 2, i.e., including a pair of hysteresis branch curves 21 and 22.

Each of the capacitors $C_{11}$, $C_{12}$, etc., is further advantageously characterized in that a sufficiently large (say) positive applied voltage induces the capacitor to follow along the lower hysteresis branch curve 21, whereas a sufficiently large negative applied voltage induces the capacitor to curve 22. The magnitude of these voltages is thus the required programming (or reprogramming) voltages for curves 21 and 22, respectively. On the other hand, unless the sufficiently large programming voltages are applied, each capacitor remains on either curve 21 or 22 depending upon the polarity of last preceding application of such programming voltage, positive or negative, respectively. Thus, by applying to a single row conductor a positive (or negative) voltage of one-half the threshold programming voltage required for switching from curve 21 to 22 (or vice versa), while applying simultaneously therewith a negative (or positive) voltage of one-half said threshold to a single column conductor, then only the capacitor at the corresponding row-column crosspoint will be thereby subjected to an above-threshold programming voltage and thereby induced into hysteresis branch curve 22 (or 21). Thus, each capacitor is individually programmable (or reversibly reprogrammable) to curve 21 or curve 22 as desired. (For the sake of clarity, the programming voltage sources are not shown in the drawing.)

An important feature of the capacitors used in this memory array (FIG. 1) is that there are at least two distinct voltage regions in which the capacitor states are stable. In one region (labeled $S_1$ in FIG. 2), the differential capacitance is single-valued and independent of the memory state of the capacitor. In the other region (labeled $S_2$ in FIG. 2), the differential capacitance is double-valued, with a relatively high differential capacitance corresponding to the upper branch curve 22, and a relatively low differential capacitance corresponding to the lower branch curve 21.

Figure 2:
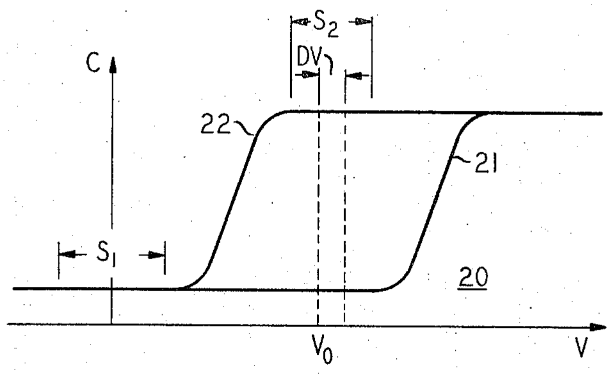
FIG. 2 shows a hysteresis loop capacitance characteristic of a memory element suitable for use in the memory array of FIG. 1, according to the invention.

In the readout operation, all the capacitors which are not being accessed are biased into region $S_1$ (FIG. 2). On the other hand, the capacitor or capacitors being accessed are biased into region $S_2$ as described in greater detail below. A small typically rectangular pulse voltage perturbation is applied to the crosspoint, and the resulting charge-flow to the columns (bit-lines) is indicative of whether the accessed capacitor cells are in the state corresponding to curve 21 versus 22. Although all the other nonaccessed cells may parasitically contribute to the readout signal and thereby contribute to a parasitic background, nevertheless, since the nonaccessed capacitors are biased in their single-valued capacitance $S_1$ regions, their total contribution to background is independent of their respective information states. Thus, this background can simply be subtracted out of the signal as a constant background.

In the absence of the above-described multi-region ($S_1$ and $S_2$) operation, the parasitic background contribution to the signal depends on the various information states of the nonaccessed cells; and hence the detection of the memory state of the accessed cell would not be feasible in arrays much larger than $10 \times 10$, i.e., 100 bits. However, using the dual ($S_1 S_2$) region capacitors of the memory array of this invention, only state-of-the-art fabrication constraints and other device limitations set an upper limit to the total size of the memory array. Using existing art, memory arrays as large as 4000 bits may well be practical in this invention.

More specifically, in order to read out the memory state (i.e., curve 21 versus 22) of a particular capacitor, say $C_{23}$, the voltage applied by the source 11 is initially set at "zero" for all terminals $T_1$, $T_2$, $T_3$ and $T_4$. Thus, all capacitors are biased initially at "zero" voltage, that is, at a voltage in their $S_1$ regions. (It should be understood, of course, that this "zero" voltage can be any convenient value within region $S_1$, and not necessarily zero itself.) Then a voltage pulse is applied by the source 11 to the row line corresponding to capacitor $C_{23}$, i.e., at row terminal $T_2$. The height of this pulse is $V_0$, as indicated in FIG. 1 at the terminal $T_2$. As further indicated in FIG. 2, advantageously this voltage $V_0$ is sufficient to bias all capacitors connected to the row line of $T_2$ (particularly $C_{23}$) to a voltage within their hysteresis loops, advantageously in region $S_2$ in which the difference in double values of differential capacitance (i.e., between curves 21 and 22) is a maximum. After a sufficient lapse of time during application of this pulse $V_0$, such that the transients (due to the pulse $V_0$) in the circuit have decayed, an additional rectangular pulse of height DV (superimposed upon the pulse $V_0$) is applied by the source 11 at terminal $T_2$. The resulting electrical current across the capacitor $C_{23}$, as measured by the current detector $A_3$ in response advantageously solely to this pulse DV, is an indication of the memory state of this capacitor $C_{23}$, namely, whether $C_{23}$ is presently on the hysteresis branch curve 22 versus 21. Specifically, a relatively large current in $A_3$ indicates that the capacitor $C_{23}$ is presently in the relatively high differential capacitance state associated with branch curve 22; whereas a relatively low current in $A_3$ indicates the relatively low capacitance state associated with branch curve 21 of this capacitor. Thus, the response of memory capacitor $C_{23}$ as measured by detector $A_3$ affords a direct readout of the memory state of $C_{23}$. Likewise, the responses of capacitor memory elements $C_{21}$, $C_{22}$ and $C_{24}$ (as measured by detectors $A_1$, $A_2$ and $A_4$) can afford simultaneous readout of these memory elements as well. Thereby, a complete four-bit "word" can be read out at once. The array of capacitors shown in FIG. 1 thus affords a reprogrammable, random access, memory array of capacitors.

Advantageously, the height of the pulse DV is selected to be relatively small as compared to $V_0$, so that the capacitance of the capacitor being read out under the voltage bias $V_0$ remains on the relatively flat portions of curve 21 or 22, and that no capacitor biased in regin region 1 is taken out of this single-valued region by the pulse DV. Thereby, the difference in response to the pulse DV of a memory capacitor on curve 21 versus 22 is a maximum, and the signal-to-noise ratio of the readout procedure is thus optimized.

Figure 3:
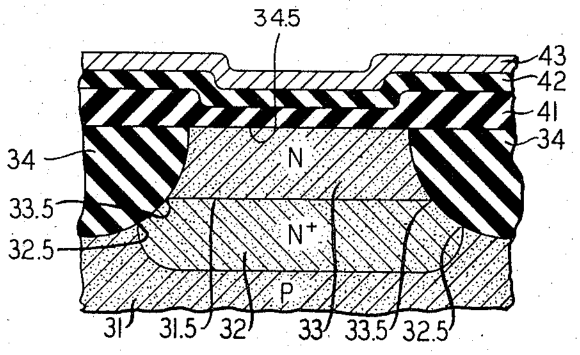
FIG. 3 is a cross-section diagram of a semiconductor memory element useful in the circuit shown in FIG. 1, in accordance with a specific embodiment of the invention.
Figure 4:
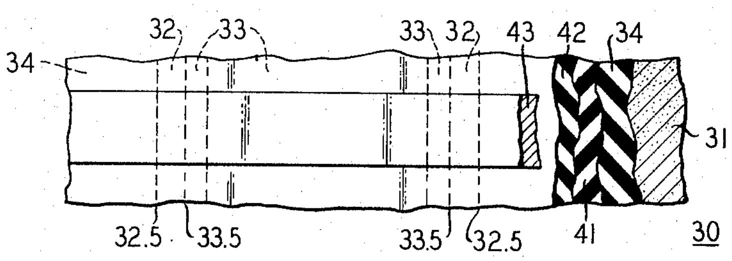
FIG. 4 is a top view diagram of the semiconductor memory element shown in FIG. 3.

FIGS. 3 and 4 illustrate a semiconductor memory capacitor element 30, incorporated in a semiconductor integrated circuit realization of the apparatus shown in FIG. 1, that is, in which all memory capacitors can be integrated in a single crystal semiconductor wafer (which wafer can also include conventional integrated transistor circuitry associated with the voltage source 11). The memory element 30 comprises a single crystal silicon semiconductor portion including a P-type substrate 31, an N+ electrode zone 32, and an N-zone 33 forming an interface 31.5 with the N+ zone 32; together with an insulator$_1$ layer 41, an insulator$_2$ layer 42, and a metal electrode stripe 43 overlying this insulator$_2$ layer. Electrical isolation rods 34 (running perpendicular to the plane of FIG. 3) serve the purpose of isolating neighboring memory elements (not shown) in an array in the substrate 31. The P-type substrate 31, the N+ zone 32 and the isolation rods 34 mutually intersect along lines 32.5; whereas the N-zone 33, the N+ zone 32 and the isolation rods 34 mutually intersect along lines 33.5 (FIGS. 3 and 4). The N+ zone 32 serves as an electrically conductive (column line) electrode stripe (say, running along the Y direction of FIG. 1) at right angles to the metal (row line) elctrode stripe 43 (say, running along the X direction of FIG. 1); whereas the N-zone 33, the insulator layers 41 and 42, and the electrode stripe 43 form a double-insulator layer semiconductor memory capacitor cell having the desired hysteresis loop differential capacitance characteristic shown in FIG. 2. Thus, each memory element 30 has a semiconductor-insulator$_1$-insulator$_2$-metal capacitor structure (zone 33, layer 41, layer 42, electrode 43) characterized by the type of hysteresis shown in FIG. 2, as desired for this invention.

By way of example, for purposes of illustration only, the following ranges of parameters are believed to be useful. The substrate 31 is P-type silicon having a net significant acceptable impurity concentration between about $10^{14}$ and $10^{16}$ per cubic centimeter, typically about $10^{15}$ impurities per cubic centimeter. The electrode zone 32 is N+ silicon having a surface resistivity of about 15 ohms per square, with a thickness (in the vertical direction of FIG. 3) of between about 3 to 7 microns in the finished device 30. The N-zone 33 is epitaxially grown silicon having a net significant donor concentration of between about $10^{15}$ and $10^{16}$ per cubic centimeter, and having a thickness in the vertical direction of about 1 to 7 microns, typically about 4 microns. The N-zone 33 has a plateau surface 34.5 with a width of about 16 microns. The isolation rods 34 are typically also about 16 microns in width, and are made of silicon dioxide. Alternatively, these isolation rods 34 can be $P^+$ diffused regions in the semiconductor substrate 31, or may be made of selectively etched troughs which are subsequently filled in with thin oxide and polycrystalline silicon. The insulator$_1$ layer 41 is silicon dioxide having a thickness of between about 1,000 and 5,000 angstroms. However, the portion of the insulator layer 41 in contact with the N-zone 33 (except for the edges thereof) is only about 50 angstroms in thickness. The insulator$_2$ layer is aluminum oxide between about 300 and 500 angstroms, typically about 400 angstroms. Finally, the electrode stripe 43 is essentially a gold stripe having a width of about 15 microns. This electrode is situated on the insulator$_2$ layer 42 running as a stripe at right angles with the electrode $N^+$ zone 32, thereby forming a crosspoint $SI_1I_2M$ capacitor (33-41-42-43). The entire memory element 30 is thus incorporated into the substrate 31, and can advantageously be fabricated in a rectangular array of substantially identical crosspoint memory elements in a rectangular mesh or grid of about one mil square in mesh size. Smaller mesh size may be obtained by reducing the widths of the N-zone 33, of the electrode stripe 43, and of the isolation rods 34 to values as low as about one-half of their above recited respective values. Moreover, transistor amplifiers and other circuitry for the voltage source 11 (FIG. 1) can be incorporated into the same substrate 31, using known techniques, in order to provide a compact integrated circuit realization of the memory array apparatus shown in FIG. 1.

One method for fabricating the memory element is as follows. $N^+$ zones (to serve as electrodes 32) ae selectively diffused or implanted in the form of longitudinal stripes into a major surface of a P-type single crystal silicon substrate. The depth of these $N^+$ zones beneath the major surface of the substrate is initially only about 0.3 to 0.4 microns; however, due to the elevated temperatures ordinarily utilized in the subsequent processing of the device 30, the final thickness of the $N^+$ electrode zone 32 in the device 30 will be much larger (typically about 3 to 7 microns). After the formation of the $N^+$ zone 32, an N-type epitaxial layer is grown on the exposed major surface (of both the $N^+$ zones 32 and the original still P-type remaining portion of the same major surface). Next, the isolation rods 34 are formed, by means of such known techniques as geometrically selective etching followed by filling-in with oxide and/or other known isolation materials, or simply by selective diffusion or implantation of sufficient acceptor impurities to make the semiconductor strongly P-type in the regions of the semiconductor serving the electrical isolation function of these isolation rods 34. Then, in order to form the insulator layer 41, a silicon dioxide layer is first grown by known techniques to a thickness of about 1,000 to 5,000 angstroms on the exposed major surface (of the followed layer 33 and the isolation rods 34), folloed by geometrically selective masking and etching-removal of this silicon dioxide layer in the region contiguous with the epitaxial N-zone 33 (except for the edges thereof) thereby exposing the epitaxial N-zone 33 except at its edges. Next, an additional layer of about 50 angstroms of silicon dioxide is grown both over the then exposed surface of the N-zone 33 and over the remainder of the silicon dioxide insulator layer, thereby forming the finished (silicon dioxide) insulator layer 41. Then the insulator layer 42, typically aluminum oxide, is deposited by known techniques on the then exposed surface of the insulator layer 41. Finally, the metal electrode stripe 43 is deposited on the exposed surface of the insulator layer 42. (Thus, is should be recognized that the vertical dimension in FIG. 4 has been shortened relative to the horizontal dimension.)

While this invention has been described in terms of specific embodiments, many modifications can be made without departing from the scope of the invention.

It should be understood, for example, that any double-valued capacitors can be used in the practice of this invention, provided that they have the above-described hysteresis loop type characteristic as illustrated in FIG. 2, whereby the capacitance can be induced to follow curve 21 or 22 depending upon the previous history of applied voltages across the capacitor.

Instead of the voltage pulse sequence indicated in FIG. 1, a steady voltage bias of $+V_0$ can be applied to all termials $T_1$, $T_2$, $T_3$, $T_4$, in combination with a superimposed negative voltage pulse $-V_0$ applied to terminals $T_1$, $T_3$ and $T_4$ in order to bias the memory cells suitably whenever a capacitor along the terminal $T_2$ is to be read out by the smaller pulse DV.

In a more symmetrical applied voltage technique, additional voltage sources may be electrically connected between the detectors $A_1$, $A_2$, $A_3$ and $A_4$ with respect to ground. In such a case, one-half of the voltage biases and/or voltage pulses can be applied to the row lines (through terminals $T_1$, $T_2$, $T_3$ and $T_4$), and negative one-half of these voltages can be applied to the column lines, as should be understood by the worker in the art. In such an arrangement, it should also be noted that only a voltage pulse of at most ½ $V_0$ need be applied to any capacitor cell except for the one cell located at the crosspoint, so that only that capacitor cell need be biased into its hysteresis loop during readout. This is advantageous in certain applications, particularly random access to a single memory cell rather than readout readout a complete "word" line.

In addition, generally, instead of using rectangular pulse DV for readout, various other voltage signals having other electrical voltage waveforms can be used for detection by $A_1$, $A_2$, $A_3$ or $A_4$, in order to detect the memory state(s) of the capacitor(s) along the corresponding column line(s). Finally, it should be mentioned that other types of multiple insulator layer (MIS) capacitors may be useful, in which more than two insulator layers ae sandwiched between the metal and semiconductor, as well as other types of capacitors exhibiting the type of characteristics indicated in FIG. 2.

It should be understood that the voltage source 11 ordinarily includes transistor circuit means to convert control signals into both appropriate bias voltages and readout voltages (the above-described first voltage pulses and second voltage pulses, respectively) for application to the array 10 of memory capacitors.

What is claimed is:

1. A memory storage apparatus which comprises a. an array of row and column electrically conductive lines forming a plurality of intersecting crosspoints;

b. an equal plurality of substantially identical two-terminal capacitor memory cells, each cell characterized by a single-valued portion and a double-valued portion hysteresis loop of differential capacitance versus voltage, and each said cell being connected across a different crosspoint at which one terminal of the cell is connected to a row line and the other terminal of the cell is connected to a column line; and c. circuit means for applying a first voltage pulse to a selected row line such that only one or more of those capacitor elements having a terminal connected to the selected row line are biased into a double-valued portion of their hysteresis loops, the others being in a single-valued portion, and for applying a second voltage singal to the selected row line within the time duration of and superimposed on the first voltage pulse, whereby the electrical current response to said second voltage signal of at least one of the capacitors having a terminal connected to the selected row line is indicative of the respective memory state of this capaccitor.

2. Apparatus according to claim 1 in which the second voltage signal is a rectangular voltage pulse.

3. Apparatus according to claim 1 in which all memory cells have a semiconductor-insulator$_1$-insulator$_2$-metal layered structure integrated in a single semiconductor wafer substrate.

4. Apparatus according to claim 1 in which all memory cells have a metal-insulator-semiconductor layered structure integrated in a single semiconductor wafer substrate.

5. Apparatus according to claim 4 in which the semiconductor is silicon.

6. Apparatus according to claim 4 in which the insulator includes at least two layers of different insulator materials.

7. The method of addressing a rectangular array of substantially identical, crosspoint connected, hysteresis loop type memory capacitor cells which comprises the step of applying a first voltage pulse to a conductive line along which a selected cell is connected, said first pulse being sufficient to bias at least the selected cell into a double-valued portion of its hysteresis loop while all cells along other lines are biased in a single-valued portion of their respective hysteresis loop characteristics, and the step of applying a second voltage signal within the time duration of and superimposed upon the first voltage pulse, whereby the electrical current response to said second signal of the selected cell is indicative of its memory state.

8. The method recited in claim 7 in which the first signal is a rectangular voltage pulse.

* * * * *

UNITED STATES PATENT OFFICE
CERTIFICATE OF CORRECTION

Patent No. 3,859,642 Dated January 7, 1975

Inventor(s) Jerry Mar

It is certified that error appears in the above-identified patent and that said Letters Patent are hereby corrected as shown below:

Col. 1, line 5, after "relates" insert --to--.
line 27, "acess" should be --access--.
Col. 3, line 41, "10" should be --20--.
Col. 5, line 24, delete "regin".
Col. 6, line 44, "ae" should be --are--.
Col. 7, line 1, "followed" should be changed to --epitaxial--.
line 2, "folloed" should be --followed--.
line 15, "is" should be --it--.
line 32, "termials" should be --terminals--.
line 52, delete "readout" and insert --of--.
line 61, "ae" should be --are--.
Col. 8, line 20, after "pulse" insert --bias--.
line 21, delete "such that" and substitute therefor --sufficient to bias temporarily--.
line 26, "singal" should be --signal--.
line 32, "capaccitor" should be --capacitor--.
line 51, after "pulse" insert --bias--.
line 53, after "bias" insert --temporarily--.

Signed and sealed this 1st day of April 1975.

(SEAL)
Attest:

RUTH C. MASON
Attesting Officer

C. MARSHALL DANN
Commissioner of Patents
and Trademarks